United States Patent
Roy et al.

(10) Patent No.: US 10,172,032 B2
(45) Date of Patent: Jan. 1, 2019

(54) ADMISSION CONTROL OF 4G/LTE CONVERSATIONAL SESSIONS BY CELLULAR BACKHAUL SATELLITE NETWORK

(71) Applicant: HUGHES NETWORK SYSTEMS, LLC, Germantown, MD (US)

(72) Inventors: Satyajit Roy, Germantown, MD (US); Ramanathan Thirunallaih, Germantown, MD (US); Bhanu Durvasula, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 24 days.

(21) Appl. No.: 15/411,817

(22) Filed: Jan. 20, 2017

(65) Prior Publication Data
US 2018/0213434 A1    Jul. 26, 2018

(51) Int. Cl.
*H04L 12/24* (2006.01)
*H04W 28/02* (2009.01)
*H04B 7/185* (2006.01)
*H04W 76/10* (2018.01)

(52) U.S. Cl.
CPC .... *H04W 28/0268* (2013.01); *H04B 7/18513* (2013.01); *H04W 76/10* (2018.02)

(58) Field of Classification Search
CPC ......... H04W 72/0486; H04W 72/1257; H04W 84/047; H04W 72/087; H04W 72/04; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | |
|---|---|---|---|
| 2009/0046642 A1* | 2/2009 | Damnjanovic | H04L 47/24 370/329 |
| 2009/0238207 A1* | 9/2009 | Zhao | H04W 28/22 370/468 |
| 2010/0322069 A1* | 12/2010 | Song | H04W 28/24 370/229 |
| 2011/0141890 A1* | 6/2011 | Giaretta | H04W 28/20 370/232 |
| 2012/0100879 A1* | 4/2012 | Tine | H04W 28/26 455/512 |
| 2012/0250603 A1* | 10/2012 | Huang | H04W 72/0486 370/315 |
| 2014/0064124 A1* | 3/2014 | Paladugu | H04W 76/19 370/252 |

(Continued)

*Primary Examiner* — Jung Liu
(74) *Attorney, Agent, or Firm* — Nath, Goldberg & Meyer; Leonid D. Thenor

(57) ABSTRACT

A system and method are disclosed for admission control of mobile conversational user sessions by a satellite network is described. When a request to admit a new session over a satellite network is received, the radio access bearer setup request is transmitted to a remote terminal of the satellite network. The system determines if a requested guaranteed bit rate for the new session is available from the remote terminal. If the requested guaranteed bit rate is available, the terminal forwards the request to a gateway of the satellite network. The new session is subsequently admitted over the satellite network and allocated the requested guaranteed bit rate.

20 Claims, 9 Drawing Sheets

(56) References Cited

U.S. PATENT DOCUMENTS

2014/0177535 A1* 6/2014 Tjandra ................ H04W 72/10
 370/329
2014/0256343 A1* 9/2014 Shaikh ................ H04W 28/22
 455/452.2
2018/0014162 A1* 1/2018 Zavesky ................ H04W 4/04

* cited by examiner

ADMISSION CONTROL OF 4G/LTE CONVERSATIONAL SESSIONS BY CELLULAR BACKHAUL SATELLITE NETWORK

BACKGROUND INFORMATION

Cellular networks are increasingly using satellite communication systems to carry cellular backhaul traffic between an Evolved Node B (eNodeB) and EPC (Evolved Packet Core). Such satellite backhaul networks carry traffic from various applications such as HTTP/TCP, VoIP (voice over IP), audio and video streaming, etc. The satellite backhaul network also carries signaling packets between eNodeB and EPC. During any given time interval, the traffic volume and rate can vary. For example, during a certain time of the day, the traffic volume may reach a peak level, while being combatively lower at all other times.

Satellite links, especially those utilizing Ka-band, can degrade due to adverse weather conditions. Since bad weather conditions are typically not persistent, however, the satellite backhaul network cannot be sized based on the worst link conditions because most of the time satellite capacity would be underutilized. In order to utilize maximum capacity over the satellite link the available bandwidth is calculated based on the least robust modulation/coding resulting in higher throughput under clear sky conditions.

Satellite backhaul networks support two main types of bandwidth quality of service (QoS), namely guaranteed bandwidth and best effort bandwidth. Best effort bandwidth is shared by multiple terminals and used for best effort types of applications, such as file transfer, backup, etc. Guaranteed bandwidth, however, is dedicated and normally used by real time applications or applications that require stringent latency and jitter factors. If the guaranteed bandwidth is oversubscribed, then congestion conditions can appear.

At the time of congestion, TCP based applications using end to end TCP flow control mechanism, along with performance enhancing proxy (PEP) flow control schemes within the satellite network, can adjust the rates to combat the congestion condition. However, non-TCP applications, notably voice and video applications will suffer. In the absence of admission control for non-TCP 4G/LTE conversational applications inside the satellite network, new calls will be blindly admitted. Such a condition can cause packets from all calls to be randomly dropped, thus affecting every session. Further, if sufficient bandwidth is not available due to link degradation, calls will be randomly affected. Based on the foregoing, there is a need for a mechanism of admission control of mobile conversational user sessions by a satellite network.

BRIEF SUMMARY

A system and method are disclosed for admission control of mobile conversational user sessions by a satellite network is described. According to an embodiment, the system includes a gateway of a satellite network for communicating with an external network, the gateway including at least one processor, and a transceiver unit for transmitting/receiving signals to/from a satellite; and a remote terminal for communicating with the gateway and the external network, the remote terminal including one or more processors, and a transceiver unit for transmitting/receiving signals to/from the satellite. The remote terminal is configured to: receive a radio access bearer setup request, from the external network, to admit a new session over the satellite network, determine if a requested guaranteed bit rate for the new session is available, and if the requested guaranteed bit rate is available: forward the request to the gateway, and admit the new session, over the satellite network, to the external network using the requested guaranteed bit rate. The gateway is configured to monitor, at least in part, available guaranteed bit rate for the remote terminal.

According to another embodiment, the method includes: receiving a radio access bearer setup request, at a remote terminal of a satellite network, to admit a new session from an external network over the satellite network; determining if a requested guaranteed bit rate for the new session is available from the remote terminal; and if the requested guaranteed bit rate is available: forwarding the request to a gateway of the satellite network, and admitting the new session, over the satellite network, to the external network using the requested guaranteed bit rate.

According to a further embodiment, the method includes: receiving radio access bearer setup request, from an external network, to admit a new session over a satellite network; transmitting the request to a remote terminal of the satellite network; determining if a requested guaranteed bit rate for the new session is available from the remote terminal; and if the requested guaranteed bit rate is available: forwarding the request to an eNodeB of the external network, and admitting the new session, over the satellite network, to the eNodeB of the external network using the requested guaranteed bit rate.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A method and system for admission control of mobile conversational user sessions by a satellite network is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
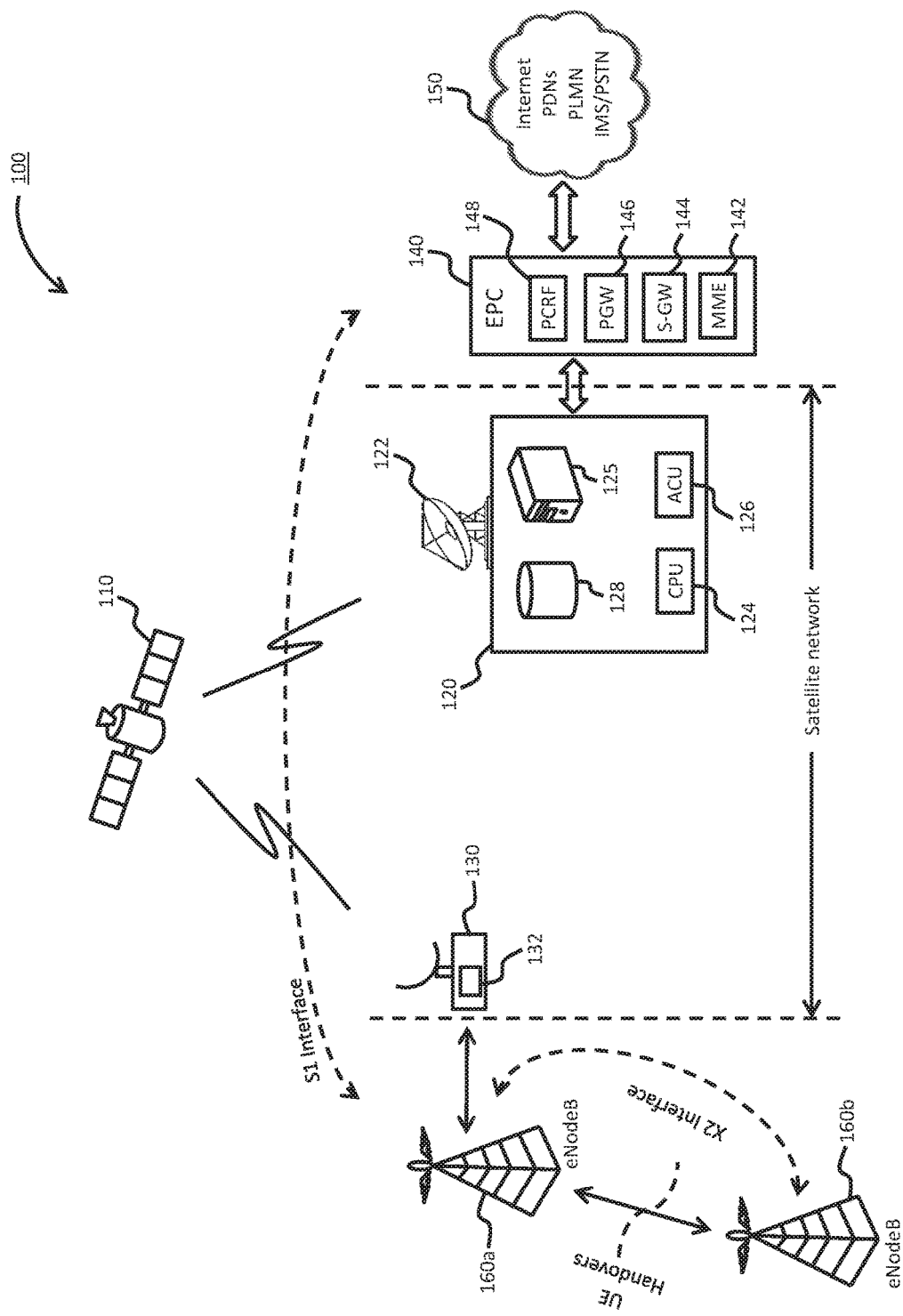
FIG. 1 is a diagram of a system capable of performing admission control of 4G/LTE sessions, according to one embodiment.

FIG. 1 is a diagram of a system capable of performing admission control of 4G/LTE sessions, according to one embodiment. The system 100 includes a satellite 110 capable of transmitting and receiving signals from various terrestrial-based communications systems. The system 100 also includes a gateway 120, and a plurality of remote terminals 150 (only one shown). The system 100 facilitates admission and transport of sessions from external networks that can include an evolved packet core (EPC) 140 and multiple Evolved Node B (eNodeB) stations 160a, 160b. According to at least one embodiment, the external network can be a mobile 4G/LTE network. According to further embodiments, the external network can be other types of mobile networks utilizing data packets for transmission of voice and/or data sessions. As further illustrated in FIG. 1, the EPC 140 can communicate with various public/private networks 150 such as the internet, public data networks (PDN), public land mobile networks (PLMN), IP media subsystems (IMS), public switched telephone networks (PSTN), etc. Additionally, the eNodeB is capable of communicating directly with user equipment such as mobile handsets.

The gateway 120 can include various components to facilitate communication with the satellite 110 and EPC 140, as well as admission of conversational user sessions from the external network over the satellite network. According to at least one embodiment, the gateway 120 can include a radio frequency (RF) transceiver 122, a processing unit 124 (or computer, CPU, etc.), and a data storage unit 128. The data storage unit 128 can be used to store and provide various access to information pertaining, in part, to operations in the satellite network. According to other embodiments, the gateway 120 can include multiple processing units 124 and multiple data storage units 128 in order to accommodate the needs of a particular system implementation. The gateway 120 can also include one or more workstations 125 (e.g., computers, laptops, etc.) in place of, or in addition to, the one or more processing units 124.

As illustrated in FIG. 1, the gateway 120 includes an admission control unit 126 which monitors the bandwidth, or bit rate, allocated to each external terminal 130 (or simply terminal) by the satellite network in order to meet a desired and/or required quality of service. For example, the admission control unit 126 can determine and maintain the total guaranteed bit rate (GBR) allocated to each terminal 130, as well as the portion of the allocated guaranteed bit rate (GBR) that remains available. The available GBR can be used to accommodate new sessions that are admitted to the satellite network. The admission control unit 126 can also access the maximum bit rate available within the satellite network to be used as a pooled resource for all terminals 130. Some, or all, of this the information pertaining to bit rates can be periodically and/or selectively supplied to each terminal 130 within the satellite network. According to various implementations, the processing unit 124 and/or workstation 125 are capable of executing program instructions such that they become configured to perform various functions associated with operation of the gateway 120. The evolved packet core (EPC) 140 can include a mobility management entity (MME) 142, a serving gateway (S-GW) 144, a packet data gateway (PGW) 146, and a policy and charging rules (PCRF) unit 148. Although not illustrated in FIG. 1, the EPC 140 can also include computers and/or processing units that are capable of executing program instructions such that they become configured to perform various functions associated with the operation thereof.

According to at least one embodiment, the mobility management entity (MME) 142 can be configured to perform various paging and tagging activities for user equipment capable of accessing the system 100. The MME 142 can also perform functions associated with bearer activation and deactivation. Depending on the specific configuration of the EPC 140, the MME 142 can also manage security keys and lawful interception of transmissions over the satellite network. The S-GW 144 can be configured to route data packets received from public/private networks 150 to the terminal 130 and vice versa, when sessions are admitted over the satellite network. According to at least one embodiment, the S-GW 144 can be configured to manage and store user equipment contexts, such as internal routing information, bearer identification information (e.g., S1AP ID, E-RAB ID), etc. The S-GW 144 can also be configured to replicate specific user traffic in order to implement lawful intercepts.

The PGW 146 can be configured to provide connectivity to data packets being transmitted over the satellite network to/from the public/private networks 150. For example, the PGW 146 can provide policy enforcement, filter and/or screen packets transmitted over the satellite network, etc. The PCRF unit 148 performs real-time operations associated with policy determination and enforcement, particularly with regards to multimedia communications. The PCRF unit 148 can also access subscriber information for the external network as well as information associated with the service available to the public/private networks 150 from the satellite network.

The system 100 also includes multiple terminals 130 (only one shown) that are part of the satellite network. Such terminals 130 can be configured, for example, as very small aperture terminals (VSAT) that are capable of transmitting/receiving information to/from the satellite 110. As such, the terminal 130 includes hardware such as computing units, modulator/demodulator, physical interfaces (e.g., network interface controller), RF transceiver, etc. that facilitate connection to an eNodeB 160a, 160b, which is an entity/hardware component of a mobile network and provides direct communication with mobile user equipment (e.g., handsets, tablets, modems, etc.). According to the illustrated embodiment, an S1 interface is used to facilitate communication between the eNodeB 160a, 160b and the EPC 140. Accordingly, standard S1 interface protocols can be used. As further illustrated in FIG. 1, multiple eNodeB 160a, 160b can be supported by a single terminal 130. The eNodeB 160a, 160b utilizes an X2 interface to facilitate communication and handovers of user devices (or user equipment) to maintain and/or complete sessions.

According to at least one embodiment, the terminal 130 can also include an admission control unit 132 which monitors the bandwidth, or bit rate, allocated to the terminal 130 by the satellite network in order to meet a desired and/or required quality of service. For example, the admission control unit 132 can maintain the total guaranteed bit rate (GBR) allocated to the terminal 130, as well as the portion of the allocated guaranteed bit rate (GBR) that remains available. The available GBR can be used to accommodate new sessions that are admitted to the satellite network. The admission control unit 132 can also access the maximum bit rate available within the satellite network to be used as a pooled resource for all terminals.

According to various embodiments, the gateway 120 can also include the admission control unit 126 in addition to, or in place of, the admission control unit 132 located within the terminal 130. When the gateway 120 contains the only admission control unit 126 in the satellite network, information pertaining to GBR, available bit rate, and maximum bit rate for all terminals 130 is determined and maintained at the gateway 120. This information can be stored and maintained, for example, in the storage unit 128. Some, or all, of the information pertaining to bit rates can be periodically and/or selectively supplied to each terminal 130 within the satellite network. When the terminal 130 also includes admission control unit 132, bit rate information can be redundantly maintained at both the gateway 120 and the terminal 130. According to various embodiments, however, the terminal's admission control unit 132 may only monitor the GBR allocated to the terminal 130 and available bit rate. Information related to the maximum bit rate for the entire satellite network can be maintained by the admission control unit 126 located at the gateway 120, and periodically transmitted to each terminal 130.

According to an embodiment, the terminal 130 can keep track of the context for each session. The context stores the guaranteed bit rate requirement of the session. Since the guaranteed bit rate is reserved by the satellite network once the session is successfully admitted, new sessions cannot take away this bandwidth. If weather conditions degrade and the terminal 130 is required to use a lower or more robust forward error correction (FEC) rate, modulation, and/or symbol rate, the available bandwidth for the terminal 130 will be reduced as more MHz spectrum is needed. The terminal 130 can re-request bandwidth reservation from the satellite network with the new link conditions. If more MHz spectrum is available, the reservation will be successful. According to at least one embodiment, if the reservation is not successful, the terminal 130 can periodically drop packets equally from all existing sessions so that all calls are equally affected. According to another embodiment, the terminal 130 can drop all packets from low priority sessions to accommodate other sessions with the originally requested GBR. According to still further embodiments, the terminal 130 can drop all packets from low priority sessions and periodically drop packets equally from higher priority sessions.

Figure 2:
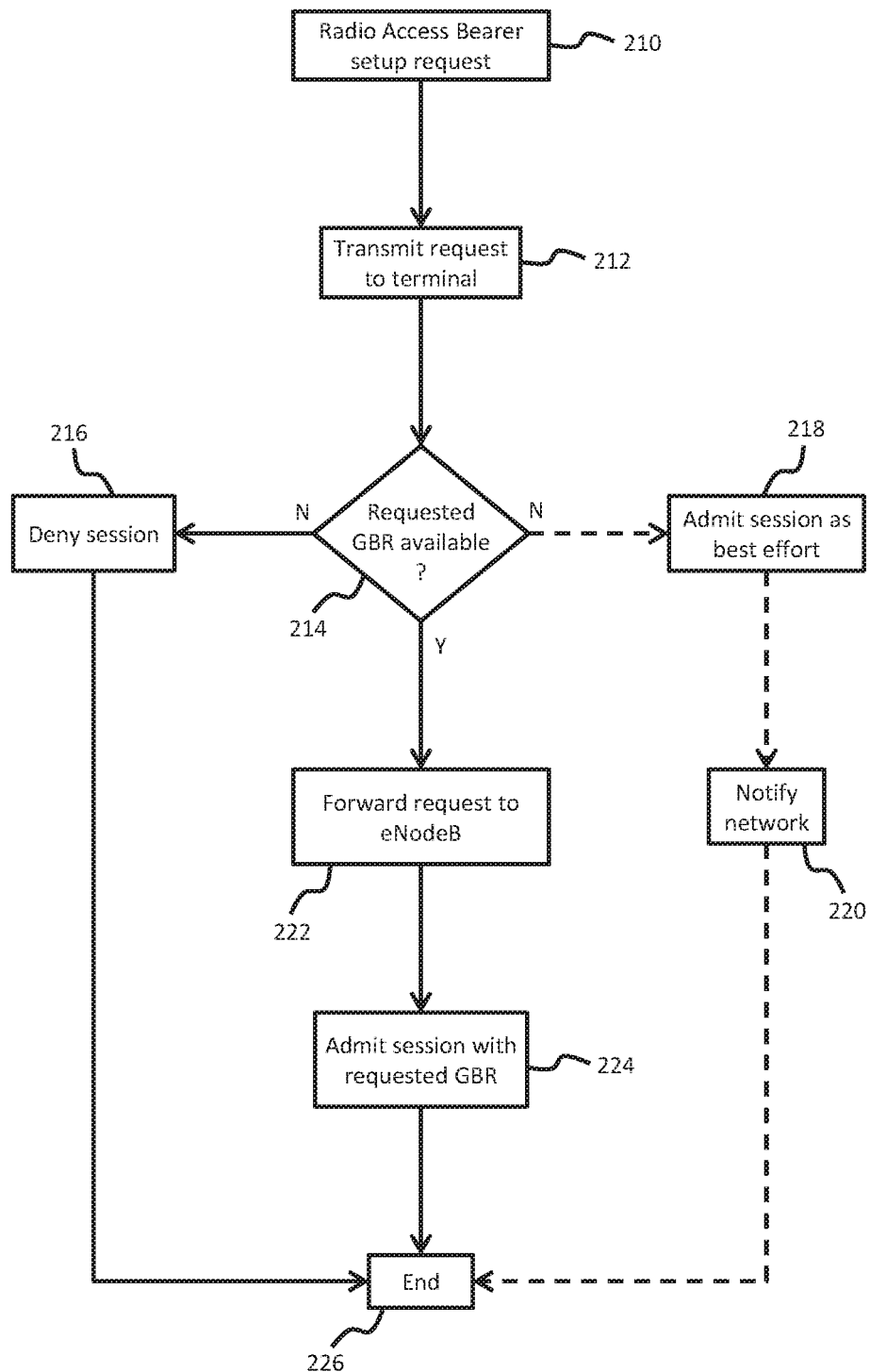
FIG. 2 is a flowchart of a process for performing admission control, according to one embodiment.

FIG. 2 is a flowchart of a process for performing admission control, according to one embodiment. At 210, a radio access bearer (RAB) setup request is received by the gateway. According to at least one embodiment, the radio access bearer setup request can be received from the eNodeB. According to other embodiments, however, the radio access bearer setup request can be received from the EPC. Furthermore, the packet data gateway can be configured as the entity which facilitates transmission of the request, and therefore, would include the necessary hardware to interface with the public/private networks as well as the gateway. At 212, the request is transmitted to the terminal. According to at least one embodiment, this can be accomplished by utilizing the RF transceiver to transmit the request, via the satellite, to the terminal.

At 214, it is determined whether a requested guaranteed bit rate (GBR) for the session is available at the terminal. According to at least one embodiment, this can be accomplished based on information stored and maintained at the admission control unit located within the terminal. According to other embodiments, however, the determination can be made using the admission control unit located at the gateway. If the requested guaranteed bit rate is not available, control passes to 216 where the session is denied. More particularly, the session would not be admitted for transmission over the satellite network. According to an embodiment, the satellite network can drop subsequent bearer setup signaling messages so that the new bearer does not get established in the mobile network. Accordingly, it would be necessary to obtain a different network (e.g., terrestrial, wireless, etc.) to carry the session. Once the session is denied, the process ends at 226.

According to at least one embodiment, if the requested guaranteed bit rate is not available, the session can be admitted, but using best effort delivery completion. This is illustrated at 218. As previously discussed, best effort QoS utilizes bandwidth that is shared by multiple, or all, terminals in the network. The bit rate utilized for the session, therefore, would vary based on overall usage of the bandwidth by other terminals in the satellite network, as well as other best effort sessions supported by the terminal. According to one or more embodiments, the external network can be subsequently notified, at 220, that the session has been admitted, but not with the requested guaranteed bit rate. According to other embodiments, however, step 220 is omitted and a notification is not sent. In such circumstances, the external network can monitor the session to determine if the required guaranteed bit rate and QoS are satisfied. If the session performance degrades below levels set by the external network, the session may be dropped. The process would then end at 226. Depending on the specific priority level assigned to the session by the external network, it is possible that the session may be immediately dropped due to the lack of available guaranteed bit rate from the terminal.

If it is determined that the requested guaranteed bit rate is available, the request is forwarded to the eNodeB associated with (i.e., serviced by) the particular terminal at 222 in order to complete any necessary handshaking/negotiation required to establish end to end completion of the session. At 224, the session is admitted within the satellite network using the requested guaranteed bit rate. More particularly, the initial context setup signaling is allowed to be completed by the satellite network. The satellite network can further save the context of the session (e.g., TEID pairs of the bearer, QCI of the bearer, GBR of the bearer, etc.), and mark the session admitted. Accordingly, all traffic associated with the session would be transmitted from the EPC to the eNodeB, and vice versa) via the satellite network. The process then ends at 226.

Figure 3:
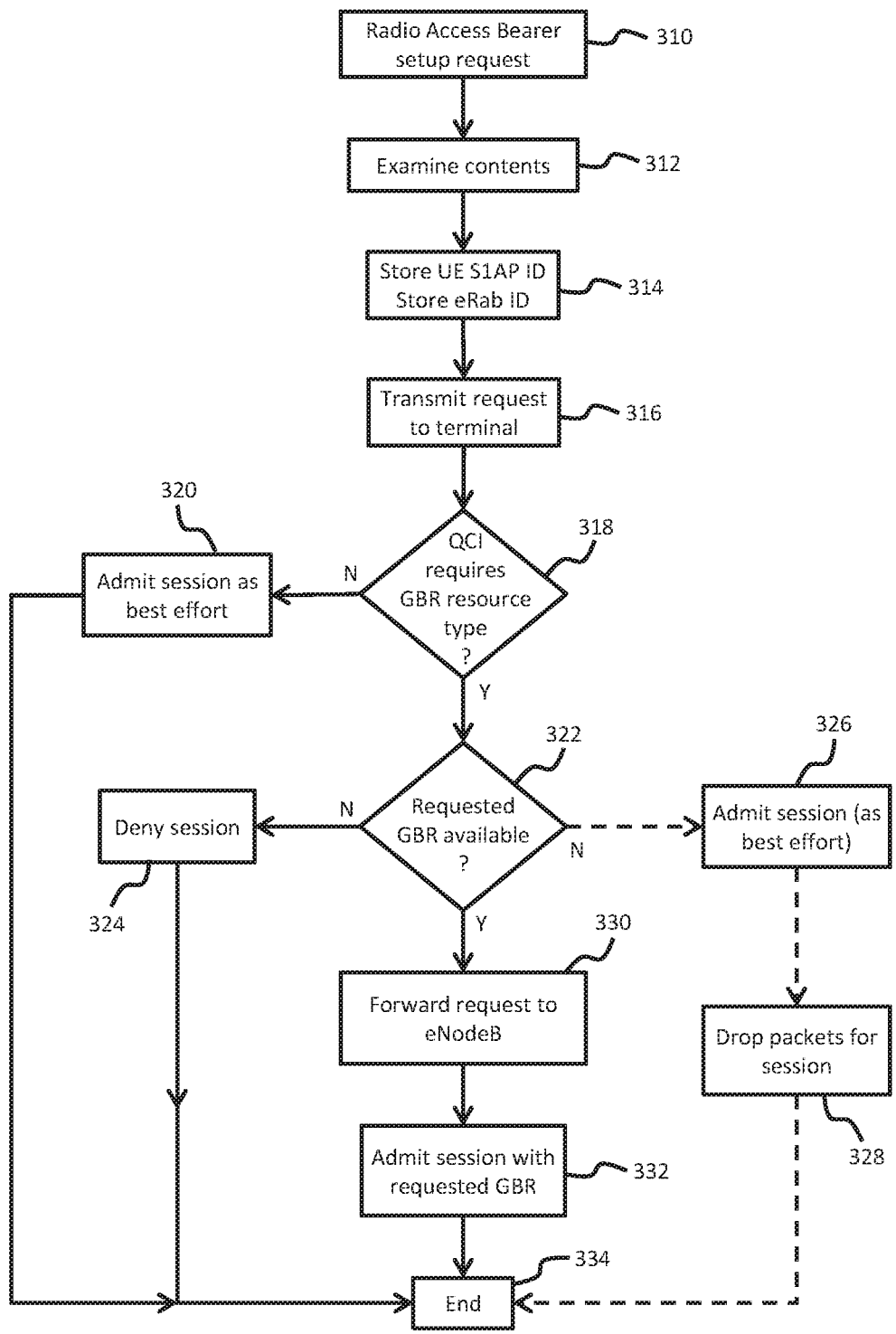
FIG. 3 is a flowchart of a process for performing admission control, according to another embodiment.

FIG. 3 is a flowchart of a process for performing admission control, according to another embodiment. At 310, a radio access bearer setup request is received. As previously discussed, the request can include, in part, information which uniquely identifies the user equipment being used for the session, and can be received by the gateway. As previously discussed, the request can be transmitted from the EPC. As will be discussed in greater detail below, it is also possible to receive a request from the eNodeB. At 312, the contents of the request are examined. According to at least one embodiment, the gateway can snoop the request in order to obtain various information. For example, the gateway can obtain the user equipment S1AP ID and/or ERAB ID for the session and store such information at 314. At 316, the request is transmitted to the terminal using the satellite network.

At 318, the terminal examines the message in order to determine whether the QoS class identifier (QCI) specifies a guaranteed bit rate resource type. According to various embodiments, QoS class identifiers having a value of 1-4, 65, or 66 require guaranteed bit rates. If the QoS class identifier does not require a guaranteed bit rate, the session is admitted as best effort delivery completion at 320. The process would then end at 334. Although not illustrated in FIG. 3, the terminal would forward the request to the eNodeB in order to perform all necessary protocol negotiation/handshaking required to establish end-to-end connectivity between the eNodeB and EPC.

If the resource type requests a guaranteed bit rate, the terminal further checks to determine whether or not the guaranteed bit rate being requested for the session remains available. According to at least one embodiment, the admission control unit collocated with the terminal can determine whether or not the requested amount of guaranteed bit rate remains available from the terminal's total amount of allocated guaranteed bit rate. According to other embodiments, the availability of the requested guaranteed bit rate can be determined by the admission control unit located at the gateway. For example, the terminal can transmit a message indicating the amount of requested guaranteed bit rate, and the gateway can respond with an indication as to whether or not the requested guaranteed bit rate is available. The gateway response can also include information indicative of the terminal's current available guaranteed bit rate.

If the requested guaranteed bit rate is not available, then control passes to the 324 where the session is denied admission to the satellite network. According to various embodiments, the session can be admitted, for example, as best effort but only to complete the initial protocol negotiations and/or handshaking. This is illustrated at 326. At 328, the terminal or gateway can monitor transmissions from the external network. The gateway would allow the signaling messages to complete and for the bearer to setup. However, the particular session is marked as not admitted in the satellite network. All subsequent packets for user traffic received on the non-admitted session would be dropped. Thus, from an end-to-end perspective, it appears as though a call was successfully setup, but unable to be completed. This differs, for example, from the situation where the session is simply denied (e.g., at 324), which appears as though the call cannot be setup at all. If the requested guaranteed bit rate is available, control passes to 330. The request is forwarded to the eNodeB serviced by the terminal, and all necessary handshaking is completed. At 332, the session is admitted with the requested guaranteed bit rate. The process then ends at 334.

According to an alternative embodiment, the terminal can release the setup request to the eNodeB, and mark the context "not-admitted." The terminal can further convey the same information to the gateway. Thus, both the terminal and gateway would drop all traffic corresponding to this session by not sending them over the air (i.e., via the satellite) to each other, thereby saving satellite bandwidth. If the session still exists (i.e., not torn down by the mobile network), the terminal retries the bandwidth reservation procedure based on predetermined triggers such as: the use of higher symbol rates, less robust FEC rate or modulation rate, reclaimed bandwidth from other terminals, etc.

Figure 4:
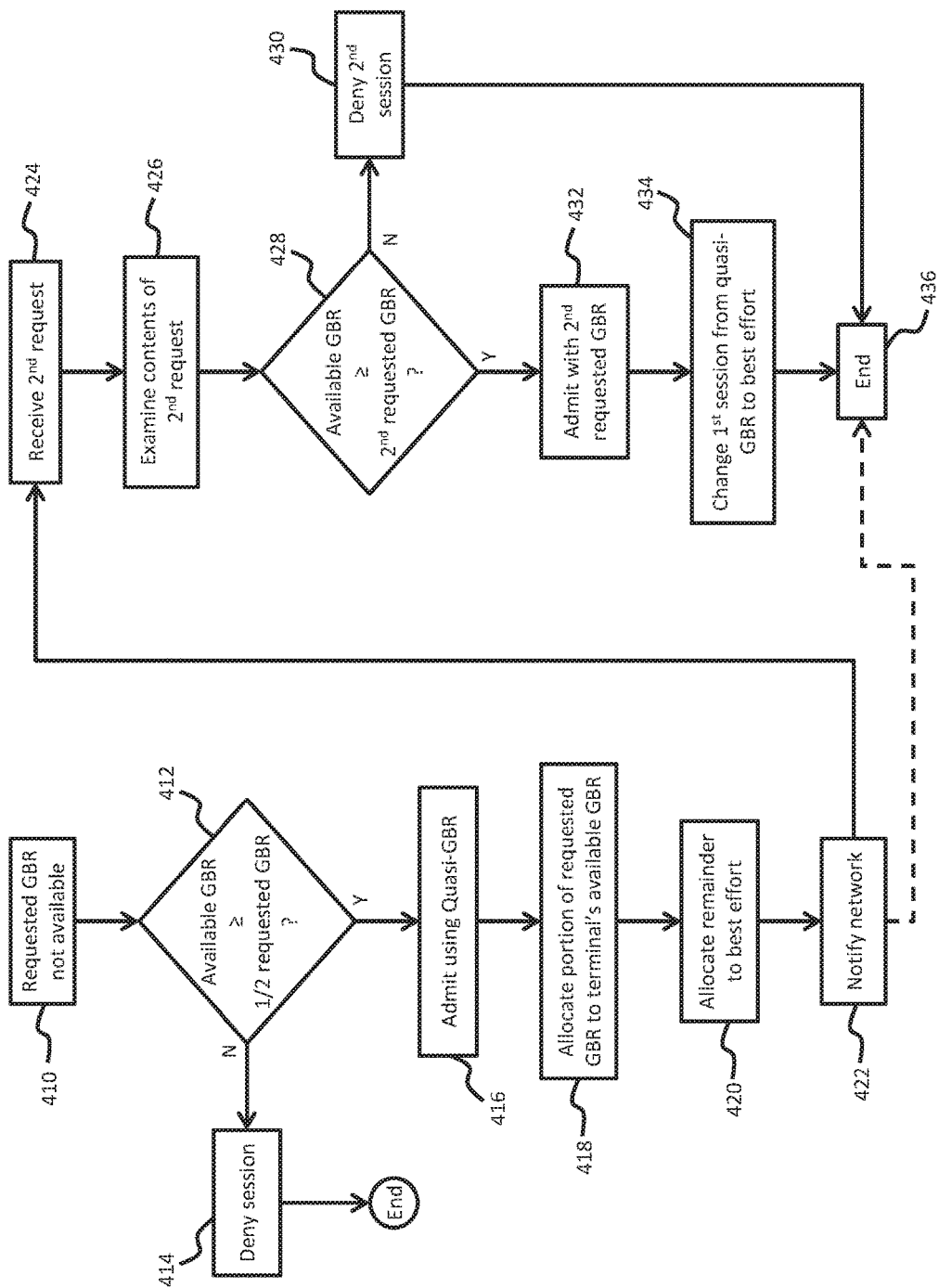
FIG. 4 is a flowchart of a process for admitting sessions when bandwidth cannot be guaranteed, according to various embodiments.

FIG. 4 is a flowchart of a process for admitting sessions when bandwidth cannot be guaranteed, according to various embodiments. The process begins at 410, after it has already been determined that the requested guaranteed bit rate is not available. At 412, it is determined whether the amount of guaranteed bit rate currently available from the terminal is greater than or equal to one half of the requested guaranteed bit rate. For example, the terminal may be capable of providing 75% of the requested guaranteed bit rate. If the available guaranteed bit rate from the terminal is not greater than or equal to one half of the requested guaranteed bit rate, control passes to 414 where the session is denied. The process would subsequently end.

According to the illustrated embodiment, if the terminal's available guaranteed bit rate is greater than one half of the requested guaranteed bit rate, then the session is admitted using a quasi-guaranteed bit rate. This is illustrated at 416. In order to implement the quasi-guaranteed bit rate, the terminal allocates a portion of the requested guaranteed bit rate using its remaining available guaranteed bit rate at 418. For example, if the terminal only has 75% of the requested guaranteed bit rate available, then it allocates the entire amount to the session. The remaining 25% of the requested guaranteed bit rate cannot be provided (or fulfilled) by the terminal. At 420, the terminal allocates the remainder of the requested guaranteed bit rate to best effort delivery completion. Thus, a portion (25%) of the requested guaranteed bit rate for the session would be carried using the pooled maximum bit rate available to all terminals in the satellite network.

At 422, the external network is notified of the session status. More particularly, the network would be notified that the entire amount of requested guaranteed bit rate was not available. However, 75% was available. Thus, the session was admitted as quasi-guaranteed bit rate session. Depending on the specific requirements for the session (e.g., latency and jitter tolerance), the external network may cancel the session and obtain a different backhaul network. Alternatively, if the latency requirements can be satisfied using the terminal's guaranteed bit rate for 75% of the requested guaranteed bit rate, the external network may allow the session to proceed. The external network can also monitor the session in order to determine whether the required QoS is satisfied. If the session quality degrades to a level that prevents satisfaction of the required QoS, the external network can cancel the session. The process would optionally end.

According to one or more embodiments, it is conceivable that a new request can be received to admit a second session over the satellite network, even though the entire amount of the terminal's guaranteed bit rate is currently in use. This is illustrated at 424, where a second request is received to admit a second session. At 426, the contents of the second request are examined in order to determine whether the QoS class identifier requires a guaranteed bit rate, and the amount of guaranteed bit rate being requested. For purposes of explanation and simplicity, the previous intermediate steps performed at the gateway prior to transmission to the terminal have been omitted.

At 428, it is determined whether the terminal's available guaranteed bit rate is greater than or equal to the second requested guaranteed bit rate. According to the illustrated embodiment, the available guaranteed bit rate being examined corresponds to the amount previously allocated to the first session as part of the quasi-guaranteed bit rate. More particularly, this available guaranteed bit rate corresponds to the amount equal to 75% of the first session requested guaranteed bit rate (from 412). If the available guaranteed bit rate from the terminal is not greater than or equal to the second requested guaranteed bit rate, then the second session is denied at 430. Control then passes the 436 where the process end. If the terminal's available guaranteed bit rate, however, is greater than or equal to the second requested guaranteed bit rate, control passes to 432. The second session is admitted and allocated the second requested guaranteed bit rate. At 434, the first session is changed from a quasi-guaranteed bit rate session to best effort delivery completion.

Depending on the specific amount of the terminal's available guaranteed bit rate and the second requested guaranteed bit rate, there may be sufficient availability to maintain the first session as a quasi-guaranteed bit rate session. For example, a situation can arise where the second requested guaranteed bit rate is less than 25% of the first session's requested guaranteed bit rate, e.g., 20%. Using the comparison at 428, the terminal would accept the second session with the second requested guaranteed bit rate. Based on the evaluation at 412, however, the terminal would still have more than one half (specifically 55%) of the requested guaranteed bit rate from the first session. Thus, it would still be possible for the terminal to maintain the first session as a quasi-guaranteed bit rate session. The process then ends at 436.

Figure 5:
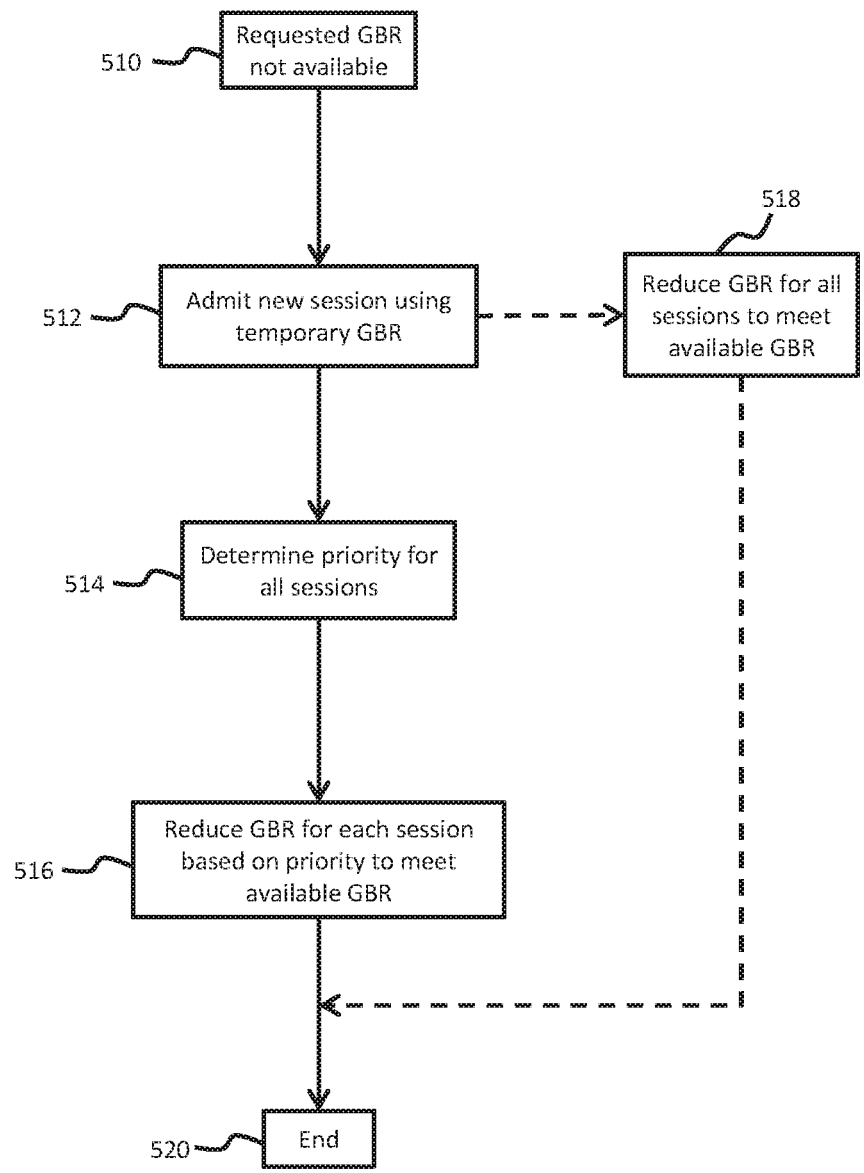
FIG. 5 is a flowchart of a process for admitting sessions when bandwidth is not available, according to at least one embodiment.

FIG. 5 is a flowchart of a process for admitting sessions when bandwidth is not available, according to at least one embodiment. The process begins at 510, after it has already been determined that the requested guaranteed bit rate is not available. At 512, the new session is admitted using a temporary guaranteed bit rate. At 514, the terminal determines the priority for all sessions that it currently supports. This includes the new session that was admitted with the temporary guaranteed bit rate. According to at least one embodiment, the priority of the sessions can be based, at least in part, on the QoS class identifier contained in the initial context setup request. At 516, the guaranteed bit rate allocated for each session is reduced, based on priority, in order to meet (or satisfy) the terminal's available guaranteed bit rate.

For example, if all the sessions supported by the terminal currently occupy 95% of the terminal's allocated guaranteed bit rate, then the terminal only has 5% remaining for new session. According to an exemplary condition, the new session now requires an additional 15% guaranteed bit rate from the terminal. Thus, the total guaranteed bit rate being requested is 110% of the terminal's maximum allocation. Accordingly, the terminal would reduce the guaranteed bit rate for each session until the total allocation is reduced to 100% (or less). The process would then end at 520. The terminal would now be capable of carrying all of the sessions using a (reduced) guaranteed bit rate criteria. According to at least one embodiment, it is also possible for the terminal to equally reduce the guaranteed bit rate allocated for all sessions in order to meet the total available guaranteed bit rate requirements, without consideration for the QoS class identifier. This is illustrated at 518. According to the embodiment illustrated in FIG. 5, all active sessions would be affected by the reduction in guaranteed bit rate. Packets could be randomly dropped from all sessions in order to provide a substantially equal reduction in quality.

Figure 6:
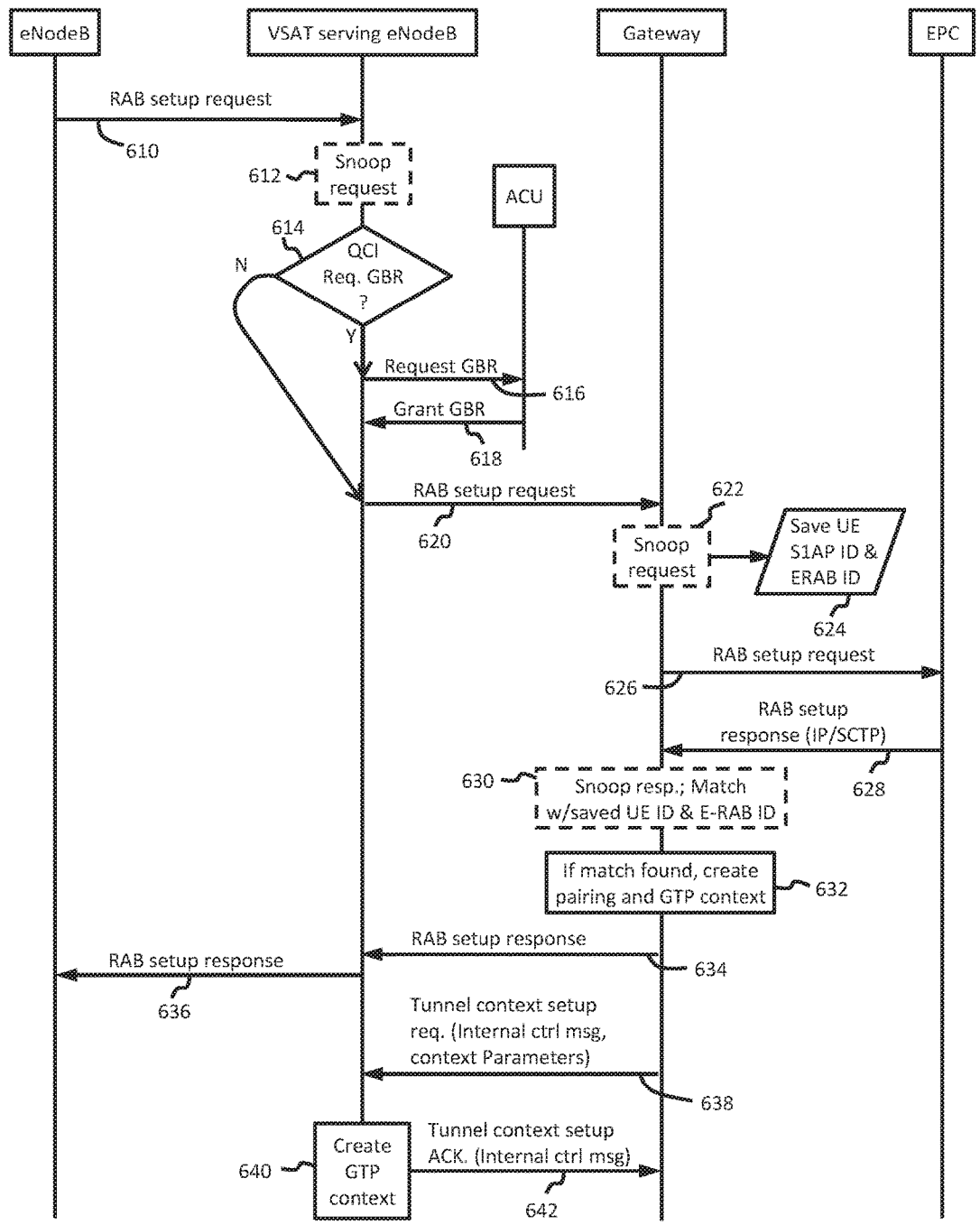
FIG. 6 is a ladder diagram illustrating successful admission of a session, according to one or more embodiments.

FIG. 6 is a ladder diagram illustrating successful admission of a session, according to one or more embodiments. At 610, the radio access bearer (RAB) setup request is transmitted from the eNodeB to the VSAT (or terminal) which serves the eNodeB. At 612, the terminal snoops the request in order to obtain information such as the QoS class identifier. At 614, the terminal determines if the QoS class identifier requires guaranteed bit rate service. If guaranteed bit rate is not required, then the terminal passes the initial context setup request to the gateway at 620. If it is determined that a guaranteed bit rate service is required, the terminal transmits a request for the guaranteed bit rate to the admission control unit at 616. As previously discussed, the admission control unit can be located at the terminal, the gateway, or both. At 618, the admission control unit responds with a message indicating that the requested guaranteed bit rate has been granted. At 620, the RAB setup request is transmitted to the gateway.

The gateway snoops the request at 622, and stores the user equipment S1AP ID and/or ERAB ID at 624. At 626, the RAB setup request is transmitted from the gateway to the EPC. At 628, the EPC transmits a RAB setup response back to the gateway. Depending on the particular session, the response can include information specific to internet protocol (IP) and/or stream control transmission protocol (SCTP). At 630, the gateway again snoops the response and attempts to match the values for the user equipment S1AP ID and/or ERAB ID contained in the response with those previously saved. If a match is found, then a pairing and GPRS tunneling protocol (GTP) context is created at 632. At 634, the RAB setup response is forwarded from the gateway to the terminal. At 636, the terminal transmits the RAB response to the eNodeB. At 638, the gateway transmits a request to the terminal to setup a corresponding tunnel context for the session. At 640, the terminal creates the GTP tunnel context. The terminal subsequently transmits an acknowledgment back to the gateway at 642. The acknowledgement can be used, for example, to indicate that the tunnel has been successfully established. All packets associated with the session would now be carried, over the satellite network, from the eNodeB to the EPC and vice versa using the requested GBR or best effort delivery.

Figure 7:
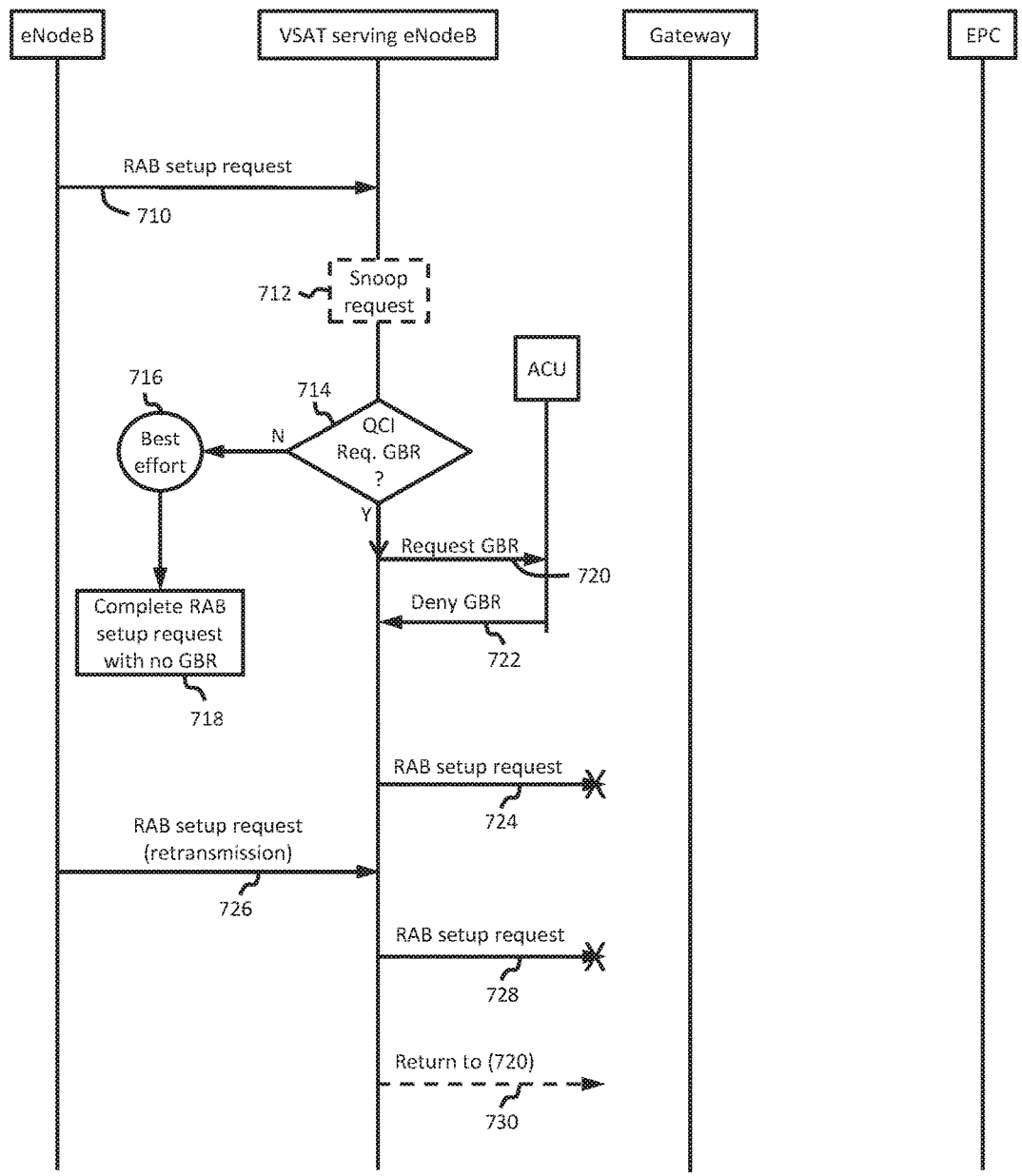
FIG. 7 is a ladder diagram illustrating denial of a session, according to one embodiment.

FIG. 7 is a ladder diagram illustrating denial of a session, according to one embodiment. At 710, the radio access bearer (RAB) setup request is transmitted from the eNodeB to the terminal. At 712, the terminal snoops the request in order to obtain information such as the QoS class identifier. At 714, the terminal determines if the QoS class identifier requires guaranteed bit rate service. If guaranteed bit rate is not required, then the terminal admits the session using best effort delivery completion at 716. The RAB setup request is completed with no guaranteed bit rate at 718. For purposes of illustrating the details of session denial, the specific steps performed to complete the RAB setup request are not shown in FIG. 7. Such steps, however, correspond to those illustrated in FIG. 6 and beginning at 620 after it has been determined that guaranteed bit rate is not required.

If the QoS class identifier requires guaranteed bit rate, however, then the terminal transmits a request to the appropriate admission control unit for the requested guaranteed bit rate at 720. As previously discussed, the embodiment illustrated in FIG. 7 shows a situation where the requested guaranteed bit rate is not available from the terminal. Accordingly, the admission control unit denies the request for guaranteed bit rate at 722. At 724, transmission of the RAB setup request to the gateway is not completed (i.e., not performed) by the terminal.

According to at least one embodiment, after a predetermined amount of time has expired, the external network (e.g., mobile network) may retransmit the RAB setup request. Under such conditions, the eNodeB forwards this request to the terminal at 726. Alternatively, the eNodeB may independently initiate the retransmission and forward the request to the terminal at 726. Since the requested guaranteed bit rate is not available from the terminal, no RAB setup request is forwarded to the gateway. This is illustrated at 728.

According to one or more embodiments, the terminal may again check with the admission control unit to see if any of the previously active sessions have ended in order to reassess the available guaranteed bit rate. Control would therefore return to 720, where a request for GBR is transmitted to the admission control unit. This is illustrated at 730. Thus, if the requested guaranteed bit rate becomes available, the terminal would now admit the session. However, the session would again be denied if the requested guaranteed bit rate remains unavailable. Alternatively, it may be possible to admit the new session as a quasi-guaranteed bit rate session based on the previously discussed embodiments. The session may also be admitted by reducing the guaranteed bit rate allocated to all active sessions, as discussed with respect to previous embodiments.

Although the foregoing embodiments have illustrated and described exchange of initial context setup request/response for a default bearer, it should be noted that a dedicated bearer can be setup in a similar manner. More particularly, the dedicated bearer can be setup by exchanging E-RAB setup request/response between the eNodeB and EPC in a manner similar to those previously described.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. The terms software, computer software computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc.

As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for performing the described functions is detailed below.

Figure 8:
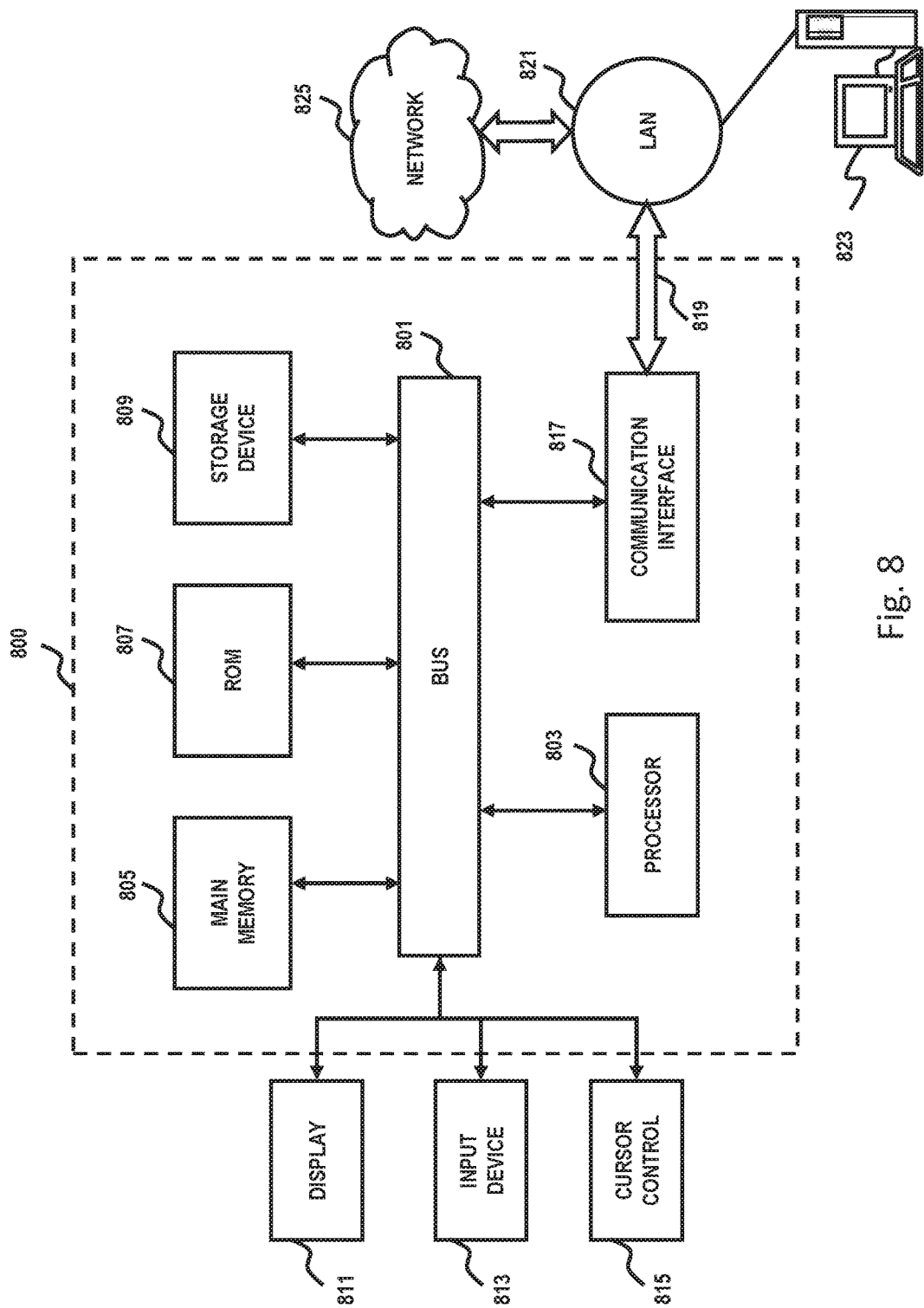
FIG. 8 is a diagram of a computer system that can be used to implement various exemplary embodiments.

FIG. 8 is a diagram of a computer system that can be used to implement various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
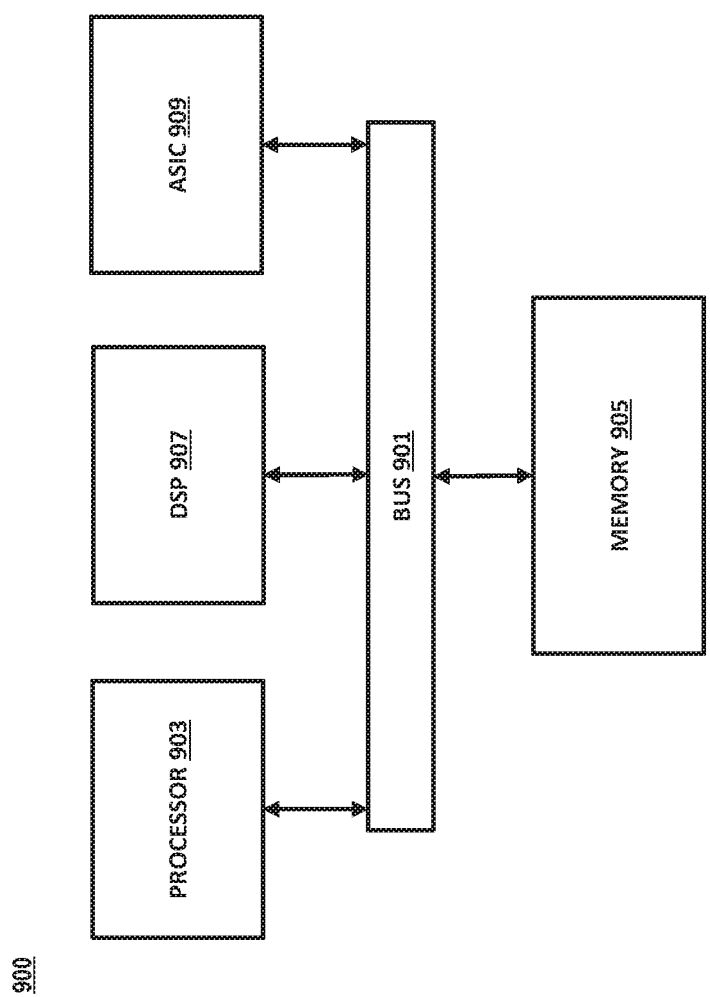
FIG. 9 is a diagram of a chip set that can be used to implement various exemplary embodiments.

FIG. 9 illustrates a chip set 900 upon which an embodiment of the invention may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving a radio access bearer setup request, at a remote terminal of a satellite network, to admit a new session from an external network over the satellite network;
   determining if a requested guaranteed bit rate for the new session is available from the remote terminal;
   if the requested guaranteed bit rate is available:
      forwarding the request to a gateway of the satellite network, and
      admitting the new session, over the satellite network, to the external network using the requested guaranteed bit rate; and
   if the requested guaranteed bit rate is not available:
      determining if the available guaranteed bit rate from the remote terminal is greater than or equal to 50% of the requested guaranteed bit rate;
      admitting the new session to the external network using a quasi-guaranteed bit rate; and
      notifying the external network of the new session status,
      wherein a portion of the requested guaranteed bit rate is allocated from the remote terminal's guaranteed bit rate, and
      wherein a remainder of the requested guaranteed bit rate is allocated from the remote terminal's maximum available bit rate using best effort delivery completion.

2. The method of claim 1, further comprising performing one of denying the new session and admitting the new session based on a best effort delivery completion, if the requested guaranteed bit rate is not available.

3. The method of claim 1, wherein receiving a radio access bearer setup request further comprises:
   examining contents of the request; and
   storing UE S1AP ID and ERAB ID values contained in the request.

4. The method of claim 1, wherein the determining further comprises detecting if the request includes a QCI that requires a guaranteed bit rate resource type.

5. The method of claim 1, further comprising:
receiving, at the remote terminal, a second radio access bearer setup request from the external network to admit a second session over the satellite network;
determining if a second requested guaranteed bit rate for the second session is less than or equal to the portion of the requested guaranteed bit rate;
admitting the second session using the second requested guaranteed bit rate; and
changing the new session from quasi-guaranteed bit rate to best effort delivery completion.

6. The method of claim 1, wherein the requested guaranteed bit rate is not available, and further comprising:
admitting the new session; and
dropping all subsequent packets containing data for the new session.

7. The method of claim 1,
wherein the requested guaranteed bit rate is not available, and
further comprising reducing guaranteed bit rates assigned to all active sessions, including the new session, until all active sessions can be accommodated by the terminal's allocated guaranteed bit rate.

8. The method of claim 7, wherein the guaranteed bit rates assigned to the active sessions are reduced based, at least in part, on session priority.

9. The method of claim 7, wherein the guaranteed bit rates assigned to the active sessions are equally reduced.

10. A system comprising:
a gateway of a satellite network for communicating with an external network, the gateway including at least one processor, and a transceiver unit for transmitting/receiving signals to/from a satellite; and
a remote terminal for communicating with the gateway and the external network, the remote terminal including one or more processors, and a transceiver unit for transmitting/receiving signals to/from the satellite;
wherein the remote terminal is configured to:
receive a radio access bearer setup request, from the external network, to admit a new session over the satellite network,
determine if a requested guaranteed bit rate for the new session is available,
if the requested guaranteed bit rate is available:
forward the request to the gateway, and
admit the new session, over the satellite network, to the external network using the requested guaranteed bit rate, and
if the requested guaranteed bit rate is not available:
determine if the available guaranteed bit rate from the remote terminal is greater than or equal to 50% of the requested guaranteed bit rate,
admit the new session to the external network using a quasi-guaranteed bit rate, and
notify the external network of the new session status,
wherein a portion of the requested guaranteed bit rate is allocated from the remote terminal's guaranteed bit rate, and a remainder of the requested guaranteed bit rate is allocated from the remote terminal's maximum available bit rate using best effort delivery completion,
wherein the gateway is configured to monitor, at least in part, available guaranteed bit rate for the remote terminal.

11. The system of claim 10, wherein the remote terminal is further configured to perform one of denying the new session and admitting the new session based on a best effort delivery completion, if the requested guaranteed bit rate is not available.

12. The system of claim 10, wherein the gateway is further configured to:
examine contents of the request; and
store UE S1AP ID and ERAB ID values contained in the request.

13. The system of claim 10, wherein the remote terminal is further configured to detect if the request includes a QCI that requires a guaranteed bit rate resource type.

14. The system of claim 10, wherein the terminal receives a second radio access bearer setup request from the external network to admit a second session over the satellite network, and the remote terminal is further configured to:
determine if a second requested guaranteed bit rate for the second session is less than or equal to the portion of the requested guaranteed bit rate;
admit the second session using the second requested guaranteed bit rate; and
change the new session from quasi-guaranteed bit rate to best effort delivery completion.

15. The system of claim 10, wherein the requested guaranteed bit rate is not available, and the remote terminal is further configured to:
admit the new session; and
drop all subsequent packets containing data for the new session.

16. The system of claim 10, wherein:
the requested guaranteed bit rate is not available, and
the remote terminal is further configured to reduce guaranteed bit rates assigned to all active sessions, including the new session, until all active sessions can be accommodated by the terminal's allocated guaranteed bit rate.

17. The system of claim 16, wherein the guaranteed bit rates assigned to the active sessions are reduced based, at least in part, on session priority.

18. The system of claim 16, wherein the guaranteed bit rates assigned to the active sessions are equally reduced.

19. A method comprising:
receiving a radio access bearer setup request, from an external network, to admit a new session over a satellite network;
transmitting the request to a remote terminal of the satellite network;
determining if a requested guaranteed bit rate for the new session is available from the remote terminal;
if the requested guaranteed bit rate is available:
forwarding the request to an eNodeB of the external network served by the terminal, and
admitting the new session, over the satellite network, to the eNodeB of the external network using the requested guaranteed bit rate; and
if the requested guaranteed bit rate is not available:
determining if the available guaranteed bit rate from the remote terminal is greater than or equal to 50% of the requested guaranteed bit rate,
admitting the new session to the eNodeB of external network using a quasi-guaranteed bit rate, and
notifying the external network of the new session status,
wherein a portion of the requested guaranteed bit rate is allocated from the remote terminal's guaranteed bit rate, and wherein a remainder of the requested guaranteed bit rate is allocated from the remote terminal's maximum available bit rate using best effort delivery completion.

20. A method comprising:
receiving a radio access bearer setup request, at a remote terminal of a satellite network, to admit a new session from an external network over the satellite network;
determining if a requested guaranteed bit rate for the new session is available from the remote terminal;
if the requested guaranteed bit rate is available:
  forwarding the request to a gateway of the satellite network, and
  admitting the new session, over the satellite network, to the external network using the requested guaranteed bit rate; and
if the requested guaranteed bit rate is not available:
  determining if the available guaranteed bit rate from the remote terminal is greater than or equal to 50% of the requested guaranteed bit rate, and
  admitting the new session to the external network using a quasi-guaranteed bit rate that is less than the requested guaranteed bit rate.

* * * * *